Nov. 17, 1953    B. M. TORREY    2,659,818
HIGH-FREQUENCY DIRECTED RADIO ENERGY SYSTEM
Filed July 21, 1950
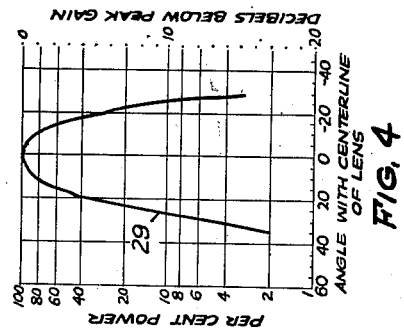
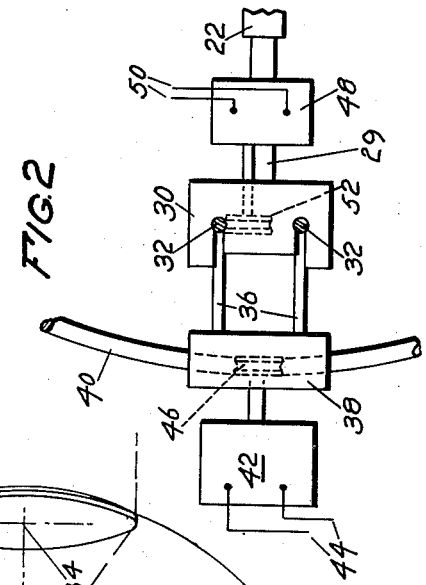
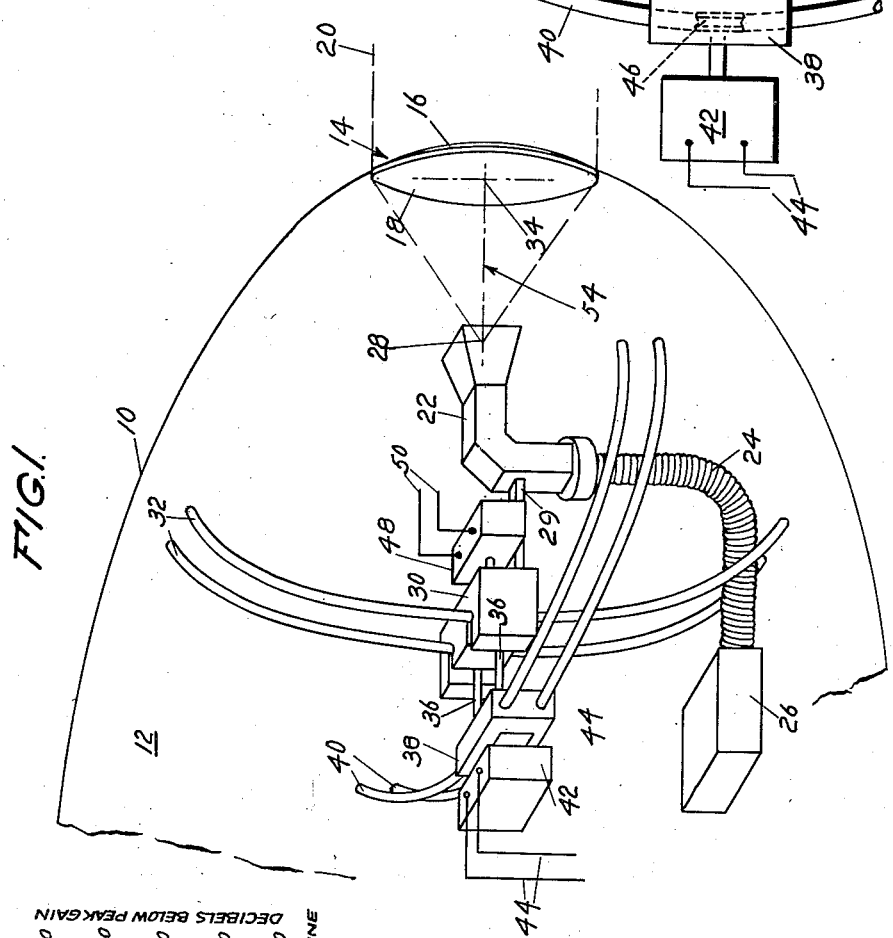
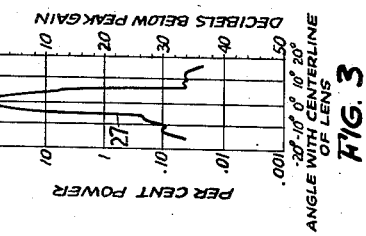
INVENTOR
BRADFORD M. TORREY
BY Elmer J. Gorn
ATTORNEY Patented Nov. 17, 1953

2,659,818

UNITED STATES PATENT OFFICE 2,659,818

HIGH-FREQUENCY DIRECTED RADIO
ENERGY SYSTEM

Bradford M. Torrey, Milton, Mass., assignor to
Raytheon Manufacturing Company, Newton,
Mass., a corporation of Massachusetts Application July 21, 1950, Serial No. 175,153

1 Claim. (Cl. 250—33.65)

This invention relates to the use of lenses for directing radio-energy radiations of radar systems in streamlined bodies.

Radar equipment in airborne installations has, in the past, required the use of radomes for protection from wind and other weather conditions. The necessarily bulky nature of radomes has many objectionable features. Besides radiation losses and beam distortion caused by the radome during scanning, another very important objection is the undesirable aero-dynamic drag. The radome protuberance from the streamlined surface of, for example, a military plane upsets the streamlined flow and causes considerable reduction in the speed attainable.

Pursuant to the present invention, the objections of radome structures are overcome and directional radar installations may be made in streamlined equipment without impairing the drag characteristics. Besides eliminating the need for a conventional radome with its resultant losses and distortions during scanning, the need for a parabolic reflector, as is usually used for obtaining a radar beam, is also eliminated. These, and other advantages, are achieved in the present invention by using a lens of dielectric material, such as polystyrene, as the directive beam-forming element in the system. The external surface of the lens may be made to approximate the proper streamlined curves of the streamlined body. By proper shaping of the inside surface of the lens in accordance with conventional trigonometric trace principles in lens design, compensation for the external curvature may be effected and a suitable beam of radiated energy from the radar system produced. In such an arrangement, proper scanning may be obtained by moving the radar horn or antenna with respect to the center line of the lens and the lens may remain stationary.

A present embodiment of the invention incorporates the above in a construction particularly adapted to highly streamlined vehicles, such as jet-propelled aircraft. In this embodiment, a lens is placed in the nose of the aircraft and mounted so that the outside contour of the lens blends with the contour of the streamlined surface of the plane. A conventional radar apparatus in the plane is arranged with its antenna or horn at the focal point of the lens. The antenna is made to move on suitable tracks about the center of the lens, thereby providing for scanning by changing the position of the antenna. Thus the lens not only takes the place of the conventional parabolic reflector providing a radio energy beam, but also provides protection of a conventional radome for the antenna and radar system in a relatively simple, inexpensive, compact and efficient construction.

These, and other objects, features and advantages will become more apparent from the following description taken in connection with the accompanying drawings, wherein:

Fig. 1 is a partially schematic and partially block diagram illustrating a typical arrangement of the invention;

Fig. 2 is a plan view of a portion of Fig. 1 to more clearly illustrate a suitable arrangement for moving the radar antenna with respect to the lens;

Fig. 3 is a graph illustrating a beam pattern obtainable in the invention; and

Fig. 4 is a graph illustrating the illumination of the lens for obtaining the beam pattern in Fig. 3.

Referring to Fig. 1 in more detail, streamlined surface 10 in the front end 12 of a jet-fighter plane has integrally mounted therein a lens 14 of suitable material, such as polystyrene, transparent to high frequency radio energy, and having an outside contour 16 blending with the streamlined surface 10. The inside surface 18 of the lens is provided with a contour arrived at through the use of geometric optics and ray-tracing, such that, together with the outside contour 16, a narrow beam 20 of radio energy is formed when an antenna or horn 22 connected through a flexible wave guide 24 to a conventional radar system 26 radiates energy at the focal point 28 of the lens 14. In the present embodiment, polystyrene with an index of refraction of 2.43 was used in plano-convex lens having a 7" diameter and a 6½" focal length and was found suitable for use with a radar system 26 operating at a frequency of 24,000 megacycles. An exemplary beam pattern obtained by this arrangement in the horizontal plane is shown by curve 27 in Fig. 3. This beam pattern was obtained by an illumination pattern over the lens in the same plane as shown by curve 29 in Fig. 4. Other types of lenses, however, such as double-convex or concave-convex design to obtain desired frontal curve 16, which may be other than spherical, may also be found to produce a suitable beam pattern 20.

The horn 22 is fixed, as by a support 29, to a block 30, arranged to slide on tracks 32 in a vertical plane. The tracks 32 have a contour such that the horn 22 will travel in a path about the center 34 of lens 14 which produces least aberration in lens 14 in forming the beam 20. The tracks 32 are mounted securely, as by supports 36, to a block 38, arranged to slide on tracks 40 in a horizontal plane. The tracks 40 also have a contour such that the antenna 22 will be made to travel about the center 34 of lens 14 in a path producing least aberration from lens 14 to the beam 20. A motor and reducing gear 42, controlled through lines 44 from a suitable control source, not shown, may be used to drive the block 38 by a pulley 46 in contact with one of the guides 40 and thereby antenna 22 along the horizontal path determined by the guides 40. In similar manner, a motor and reducing gear 48 controlled through lines 50 may be used to drive a pulley 52 in contact with one of the guides 32 to move the horn 22 in a vertical plane. The horn 22 is preferably directed at all times toward the center 34 of lens 14. In this manner, suitable scanning may be obtained up to 30 degrees in any direction from the center line 54 of the lens 14 without serious deterioration of the pattern of beam 20 due to limitations in the lens 14.

While a lens 14 may be used in a system operating below 24,000 megacycles, the necessary increase in dimensions of the lens required by the increased wave length of such lower frequency energy makes it preferable to confine such lens applications to systems operating above 20,000 megacycles.

To assist in proper illumination of the lens and thereby prevent undesirable side lobe effects, the inside of the streamline surface 18 and other reflecting surfaces may be coated with a radiation-absorbing substance, such as carbon or finely divided iron particles.

This invention is not limited to the particular details of construction, materials and processes described, as many equivalents will suggest themselves to those skilled in the art. It is accordingly desired that the appended claim be given a broad interpretation commensurate with the scope of the invention within the art.

What is claimed is:

A radar system comprising: a vehicle having a wall provided with a streamline surface; a lens of dielectric material constituting a part of said wall; the curvature of one surface of said lens conforming to the streamline of said wall, and the curvature of another surface of said lens cooperating with said first-named curvature to provide said lens with a predetermined beam-forming characteristic; a directive radio-frequency energy radiating horn mounted in said vehicle substantially at the effective focal point of said lens; and means for rotating said radiating element in selected planes about the center of said lens.

BRADFORD M. TORREY.

References Cited in the file of this patent

UNITED STATES PATENTS

| Number | Name | Date |
|---|---|---|
| 1,955,603 | Lamblin-Parent | Apr. 17, 1934 |
| 2,276,104 | Shaunessy | Mar. 10, 1942 |
| 2,399,954 | Thomson | May 7, 1946 |
| 2,442,951 | Iams | June 8, 1948 |
| 2,501,479 | Sproule | Mar. 21, 1950 |
| 2,518,843 | Wehner | Aug. 15, 1950 |
| 2,540,121 | Jenks | Feb. 6, 1951 |
| 2,547,416 | Skellett | Apr. 3, 1951 |